United States Patent
Miller et al.

(10) Patent No.: US 6,320,487 B1
(45) Date of Patent: Nov. 20, 2001

(54) CONTROL DEVICE WITH TAILORED FEEDBACK

(75) Inventors: Robin Mihekun Miller, Ellington, CT (US); Hollister A. Hartman, Northville, MI (US)

(73) Assignee: Lear Automotive Dearborn, Inc., Southfield, MI (US)

(*) Notice: Subject to any disclaimer, the term of this patent is extended or adjusted under 35 U.S.C. 154(b) by 487 days.

(21) Appl. No.: 08/823,964

(22) Filed: Mar. 25, 1997

(51) Int. Cl.[7] ........................................ H01F 7/08
(52) U.S. Cl. ............................... 335/274; 335/270
(58) Field of Search ........................ 335/270, 272, 335/274, 275, 276, 185–191; 318/561, 637–638, 601, 615, 616; 340/984

(56) References Cited

U.S. PATENT DOCUMENTS

| | | |
|---|---|---|
| 4,543,515 | 9/1985 | Suzuki . |
| 4,560,983 | 12/1985 | Williams . |
| 4,730,177 * | 3/1988 | McSparran ........................ 335/272 |
| 4,733,214 | 3/1988 | Andresen . |
| 5,398,013 * | 3/1995 | Suzuki et al. ..................... 335/172 |
| 5,448,234 * | 9/1995 | Harwood ........................... 340/984 |
| 5,559,412 * | 9/1996 | Schuler ............................. 318/561 |

FOREIGN PATENT DOCUMENTS

| | | |
|---|---|---|
| 19528457A1 | 2/1997 | (DE) . |
| 565143A2 | 10/1993 | (EP) . |

OTHER PUBLICATIONS

International Search Report for International Application No. PCT/US98/04019 with an International Filing Date of Mar. 2, 1998.

* cited by examiner

*Primary Examiner*—Lincoln Donovan
(74) *Attorney, Agent, or Firm*—Brooks & Kushman P.C.

(57) ABSTRACT

A control switch assembly includes a variable and selectively activatable feedback unit. The feedback unit provides tactile feedback to a user of the system depending upon a particular adjustment to be made by manipulating the control switch. In the preferred embodiment, the feedback unit includes an electromagnetic arrangement that is selectively energized to provide tactile feedback under preselected conditions.

9 Claims, 1 Drawing Sheet

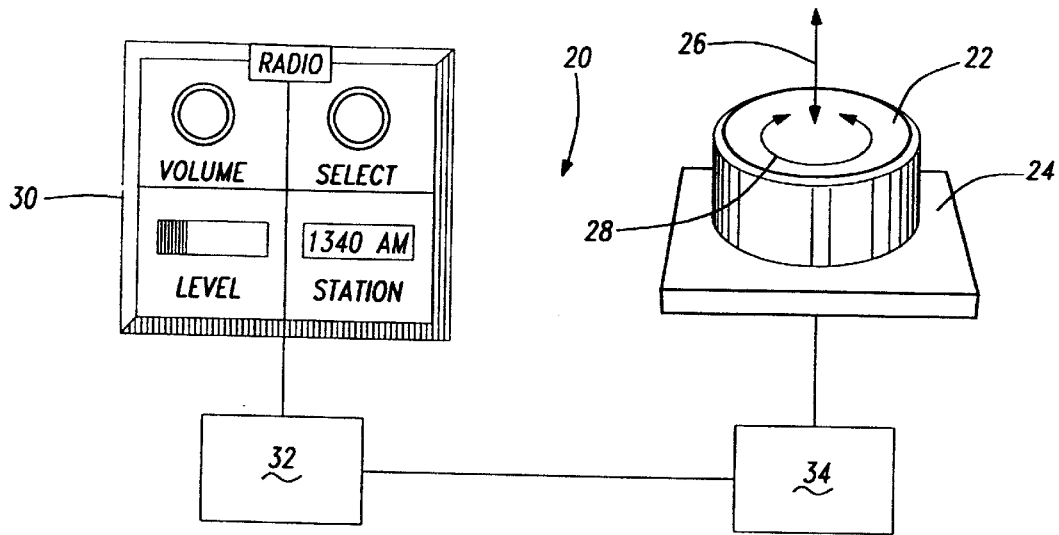
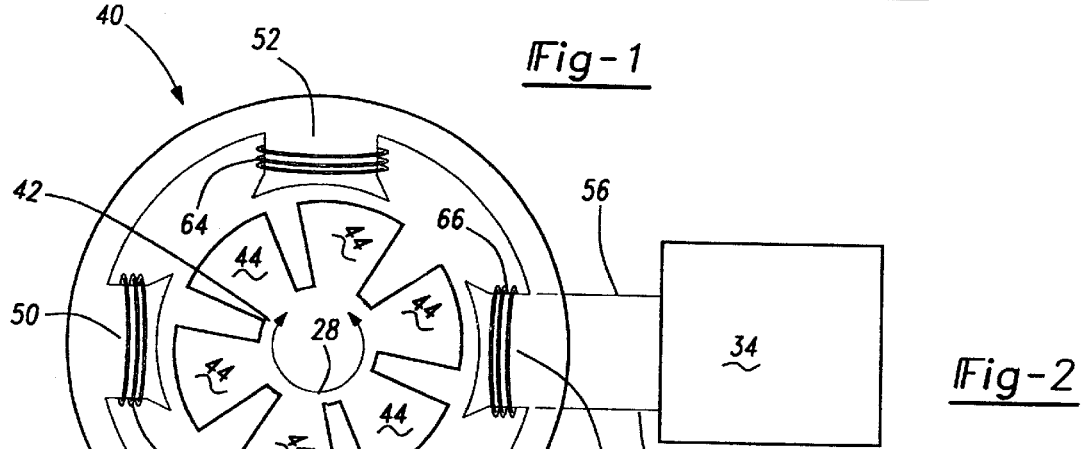
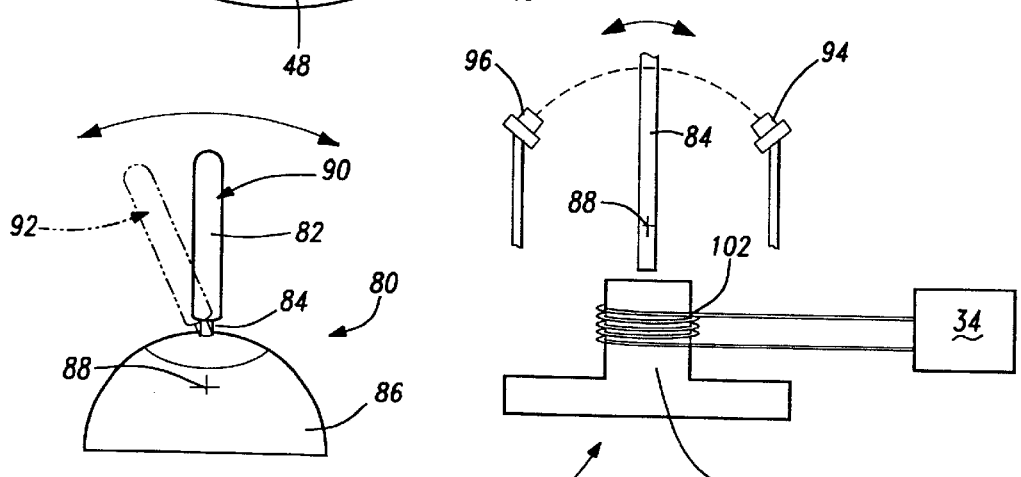
Fig-1
Fig-2
Fig-3
Fig-4

CONTROL DEVICE WITH TAILORED FEEDBACK

BACKGROUND OF THE INVENTION

This invention generally relates to a control switch and device that includes tailored feedback to assist a person in adjusting various functions for a variety of systems.

Modern mass production vehicles tend to include more and more special features or subsystems. The addition of more features to a vehicle provides the potential for a more enjoyable driving experience; however, introducing more and more features or subsystems into a vehicle is not without problems.

An important need is to provide a driver the ability to control or adjust the various available subsystems without unduly distracting the driver from the task of driving the vehicle. It is important, therefore, to provide a driver with input control devices that allow a driver to realize that a desired adjustment or function selection has been accomplished without diverting the driver's attention from the road.

Therefore, there is a need for a device that is readily usable by a driver to control a variety of the subsystems available within a vehicle. Prior to this invention, no satisfactory solution has been found that addresses the various needs discussed above. This invention is a device that provides customized feedback to a driver, which is indicative of the adjustment or selection that has been made. Moreover, this invention provides a device that is readily usable for controlling a variety of functions for a variety of vehicle subsystems.

SUMMARY OF THE INVENTION

In general terms, this invention is a device that allows a user to control or adjust a variety of vehicle subsystems while providing the user with tailored feedback indicative of the adjustment or selection made. The preferred form of this invention includes a single control that is manipulatable by a user. A selectively activatable tactile feedback unit provides tactile feedback that is indicative of movement of the control as the user manipulates the control when the feedback unit is activated. The feedback unit is only activated for certain subsystems and certain functional adjustments. Therefore, an efficient, space-saving and safety-enhancing control device is achieved.

In the preferred embodiment of this invention, the tactile feedback unit includes a magnetic arrangement that is selectively energizable. When the magnetic arrangement is energized, rotation of a control, for example, results in the tactile detection of adjustment increments as the control is rotated. This is useful, for example, in selecting preset radio stations. When the feedback unit is not energized, rotation of the control is smooth. Smooth rotation provides an adequate feel for such function adjustment as volume or cruise control.

The various features and advantages of this invention will become apparent to those skilled in the art from the following detailed description of the presently preferred embodiment. The drawings that accompany the detailed description can be described as follows.

BRIEF DESCRIPTION OF THE DRAWINGS

FIG. 1 is a schematic diagram of a system designed according to this invention.

FIG. 2 is a schematic illustration of a feedback unit designed according to this invention.

FIG. 3 is a diagrammatic illustration of another embodiment of this invention.

FIG. 4 is a diagrammatic illustration of selected components of the embodiment of FIG. 3.

DETAILED DESCRIPTION OF THE PREFERRED EMBODIMENT

FIG. 1 illustrates a control system 20 including a control 22 that is supported on a base portion 24. The control 22 preferably is moveable relative to the base portion 24 in two different ways. First, the control 22 can be pressed toward the base portion 24 and spring biased back to a raised rest position. This is schematically illustrated by the arrow 26 in FIG. 1. Such movement preferably yields an audible click or beep, which provides readily recognizable feedback to a user.

The control 22 also preferably is rotatable relative to the base portion 24 as schematically illustrated by the arrow 28 in FIG. 1. The base portion 24 can be part of a vehicle console, instrument panel or part of a vehicle steering wheel, for example.

A visual display 30 is provided to visually indicate the selected vehicle subsystem and the current adjustment status of various functions associated with that subsystem. In the illustration, for example, the vehicle radio functions of volume adjustment and station selection are displayed on the display screen 30. The various vehicle subsystems, such as the radio, heating, venting and air conditioning, fan control, cruise control, etc., are controlled by a controller 32. The controller 32 can be realized through a conventional microprocessor, specially designed software or circuitry, or a combination of all three. Given this description, those skilled in the art will be able to realize a controller 32 that is useful for carrying out this invention. The controller 32 controls the vehicle subsystems and the display screen 30.

The control 22 preferably is versatile in that it provides feedback which is tailored to particular vehicle subsystems to the driver or user. A feedback unit 40 (see FIG. 2, for example) is selectively energized through an energization controller 34 so that various types of feedback can be achieved depending on the currently selected vehicle subsystem. Although energization controller 34 and the system controller 32 are illustrated as separate modules in FIG. 1, those skilled in the art will realize that both controllers could be achieved in a single microprocessor, dedicated circuitry, custom-designed software or a combination of all three.

Referring to FIG. 2, the feedback unit 40 includes a rotating wheel portion 42. The embodiment of FIG. 2 is particularly useful for a control 22 as illustrated in FIG. 1, which is rotated to make adjustments to a subsystem function, for example. The wheel portion 42 includes a plurality of radially extending teeth 44. The wheel portion 42 preferably is made of a ferromagnetic material. The wheel portion 42 preferably rotates in unison with the control 22 as the control 22 is rotated by a user.

A stationary member 46, which is a stator in the illustrated embodiment, includes a plurality of poles 48, 50, 52 and 54. The stationary member 46 preferably is also made from a ferromagnetic material. The stationary member 46 need not surround the rotary member 42 provided that relative movement between the two is possible.

A pair of wires 56 and 58 form a plurality of windings 60, 62, 64 and 66. Each winding is disposed about a respective one of the plurality of poles. The energization controller 34 controls a supply of electrical current across the wires 56 and 58 and, consequently, through the windings 60, 62, 64 and 66 so that an electromagnetic field is generated at each of the poles. When the feedback unit 40 is energized, the presence of the electromagnetic fields can be detected by a user that is manipulating or rotating the control 22. As the teeth portions 44 become aligned with and then rotate past the poles, the magnetic field introduces resistance at incremental intervals when turning the control 22. These are sensed by the user as a conventional detent would be sensed on a purely mechanical control arrangement. Such tactile feedback is useful for indicating the amount of rotation of the control 22.

When the feedback unit 40 is not energized, there is no magnetic field present and the control 22 is freely rotatable by the user of the system. Accordingly, this invention allows a single control to be used in two different manners. First, smooth rotation can be used for adjusting subsystem functions such as temperature control, cruise control or volume control. Detented rotation, on the other hand, may be useful for selection between a variety of preset radio stations or selecting from among various menus for the various vehicle subsystems that can be controlled through the controller 32. The detented, tactile feedback provided to the user is a useful indication of a desired adjustment that reduces the difficulty of the adjustment task and allows a driver of a vehicle to give more attention to the road.

In the embodiment illustrated in FIG. 2, it is possible to have varying levels of detented rotation. For example, assume that the windings 60 and 64 are electrically coupled but isolated from the windings 62 and 66, which are electrically coupled together. One type of detented rotation is achieved by energizing only the windings 60 and 64 while another type of detented rotation, which includes increments on a more frequent basis, is achieved by energizing all four of the windings at the same time. Those skilled in the art will realize that arrangements having more than four poles and a variety of tooth and pole profiles or configurations can be used to achieve different tactile feedback.

Another variation on the above that is preferred in some situations is to place the entire assembly inside a non-magnetic material. Such an arrangement achieves smooth outline and oxidization resistance characteristics.

FIG. 3 illustrates another embodiment of this invention. Instead of a pressable and rotatable control 22, the embodiment 80 of FIG. 3 includes a joy stick handle 82. The joy stick handle 82 is supported on a joy stick shaft 84 that preferably is made from a ferromagnetic material. The shaft 84 is mounted to pivot relative to a housing 86 about a pivot point 88. Those skilled in the art are familiar with joy stick mounting arrangements and, therefore, the following description need not go into great detail about the physical configuration of the joy stick itself.

In the preferred embodiment, the joy stick handle 82 is biased into a centered position illustrated at 90. As schematically illustrated by the arrow in FIG. 3, the joy stick handle 82 can be manipulated from the centered position 90 into a variety of positions, an example of which is illustrated at 92. The number of directions that the joy stick handle 82 can be moved is variable depending on the needs of a particular application.

As illustrated in FIG. 4, the embodiment of FIG. 3 preferably includes a plurality of switches that are activated by movement of the joy stick handle 82. Two example switches 94 and 96 are illustrated. As the joy stick handle 82 is moved into the position 92, for example, the shaft 84 will contact and activate the switch 96. This results in some adjustment or selection within a particular selected subsystem, for example.

As illustrated, the embodiment of FIGS. 3 and 4 preferably includes a feedback unit 40. In this embodiment, a ferromagnetic pole 100 and a winding 102 are provided for generating a magnetic field when the energization controller 34 allows electrical current to flow through the wires that make up the winding 102. Since the shaft 84 preferably is made from a ferromagnetic material, the presence of an electromagnetic field at the pole 100 will tend to urge the shaft 84 into the centered position 90. Accordingly, initial movement of the joy stick out of the centered position is met with resistance that is sensed as tactile feedback by the user of the joy stick.

The feedback unit 40 can be selectively turned on and off depending on the particular subsystem that is currently being controlled or adjusted by the user of the system. Although not specifically illustrated, an appropriately designed pole 100 will provide further tactile feedback to the user when the joy stick is near a fully extended or manipulated position. Such tactile feedback is useful for providing a user of the joy stick an indication that they are approaching one of the switches 94 or 96, for example. For example, the amount of resistance preferably is increased as the handle 82 moves further from the centered position. Again, such an arrangement can be selectively activatable so that certain functions of certain subsystems can be adjusted using the joy stick handle 82 without tactile feedback and others can include tactile feedback. The details of an electromagnetic arrangement for accomplishing such tactile feedback need not be further described here because, given this description, those skilled in the art will realize how to design one to meet particular needs.

The foregoing description is exemplary rather than limiting in nature. Variations and modifications to the disclosed embodiments may become apparent to those skilled in the art that do not necessarily depart from the purview and spirit of this invention. For example, the layout or physical arrangement of the components of the feedback unit may include axially oriented members that move relative to an electromagnetic field. Accordingly, the following claims must be studied to determine the scope of legal protection afforded this invention.

What is claimed is:

1. A user interface device, comprising:

a control that is manipulatable by a user in a first direction;

a power supply; and a selectively activatable tactile feedback unit that provides tactile feedback to the user that is indicative of movement of said control as the user manipulates said control in said first direction when said feedback unit is powered by said power supply independent of a position of said control;

wherein said control is supported to rotate in said first direction and wherein said feedback unit is an electrically operated unit that provides a plurality of tactile interruptions along a rotation of said control in said direction;

wherein said feedback unit comprises:

a rotating member, supported to rotate with said control made from a ferromagnetic material and having a plurality of teeth that move as said rotating member is rotated;

a stationary member positioned so that said rotating member teeth move relative to said stationary member as said control is manipulated in said direction, said stationary member including a plurality of poles; and a winding positioned about each said pole and connected to a source of electrical energy so that said windings selectively carry electrical current when said feedback unit is activated;

wherein said stationary member further includes a second plurality of poles interspersed among said poles, and a second winding is positioned about each said second pole and selectively connected to a second source of electrical energy so that said windings selectively carry electrical current when said feedback unit is activated.

2. A user interface device, comprising:

a control that is manipulatable by a user in a first direction;

a power supply; and a selectively activatable tactile feedback unit that provides tactile feedback to the user that is indicative of movement of said control as the user manipulates said control in said first direction when said feedback unit is powered by said power supply independent of a position of said control;

wherein said control is supported to rotate in said first direction and wherein said feedback unit is an electrically operated unit that provides a plurality of tactile interruptions along a rotation of said control in said direction;

wherein said feedback unit comprises:
  a rotating member, supported to rotate with said control made from a ferromagnetic material and having a plurality of teeth that move as said rotating member is rotated;
  a stationary member positioned so that said rotating member teeth move relative to said stationary member as said control is manipulated in said direction, said stationary member including a plurality of poles; and
  a winding positioned about each said pole and connected to a source of electrical energy so that said windings selectively carry electrical current when said feedback unit is activated;

wherein said rotating member comprises a rotor having a central body portion and said teeth are circumferentially spaced about and projecting radially outward from said body portion and wherein said stationary member comprises a generally circular stator that generally surrounds said rotor and wherein said poles project radially inward from a generally ring-shaped body portion of said stator;

wherein said stator further includes a second plurality of poles interspersed among said poles, and a second winding is positioned about each said second pole and selectively connected to a source of electrical energy so that said second windings selectively carry electrical current when said feedback unit is activated.

3. A user interface device, comprising:

a control that is manipulatable by a user in a first direction;

a power supply; and a selectively activatable tactile feedback unit that provides tactile feedback to the user that is indicative of movement of said control as the user manipulates said control in said first direction when said feedback unit is powered by said power supply independent of a position of said control;

wherein said control is pivotally mounted to be pivotally manipulated about a pivot point from a centered position in at least said direction and wherein said feedback unit includes a magnetic force imposing device that causes a changing amount of tactile resistance to movement of said control as said control is moved from said centered position.

4. A device for controlling a plurality of subsystems, comprising:

a system controller adapted to activate a selected one of the subsystems;

a single control that is manipulatable by a user to signal to said system controller how to control the selected subsystem;

a feedback unit that selectively provides tactile feedback to the user that is indicative of movement of said control as the user manipulates said controls; and an energization controller that selectively energizes said feedback unit by providing power to said feedback unit on a continuous basis responsive to certain preselected subsystem controls being activated;

wherein said control is supported to rotate in a first and second direction, respectively, and wherein said feedback unit is electrically operated and provides a plurality of electrically caused tactile increments along a rotation of said control in at least one of said directions;

wherein said feedback unit comprises:
  a rotating member, supported to rotate with said control in said directions, made from a ferromagnetic material and having a plurality of teeth that move as said rotating member is rotated;
  a stationary member positioned so that said rotating member teeth move relative to said stationary member as said control is manipulated in said directions, said stationary member including a plurality of poles; and
  a winding positioned about each said pole and connected to a source of electrical energy so that said windings carry electrical current when said feedback unit is energized;

wherein said rotating member comprises a rotor having a central body portion and said teeth are circumferentially spaced about and projecting radially outward from said body portion and wherein said stationary member comprises a generally circular stator that generally surrounds said rotor and wherein said poles project radially inward from a generally ring-shaped body portion of said stator;

wherein said stator further includes a second plurality of poles interspersed among said poles, and a second winding is positioned about each said second pole and selectively connected to a source of electrical energy so that said second windings selectively carry electrical current when said feedback unit is energized.

5. A device for controlling a plurality of subsystems, comprising:

a system controller adapted to activate a selected one of the subsystems;

a single control that is manipulatable by a user to signal to said system controller how to control the selected subsystem;

a feedback unit that selectively provides tactile feedback to the user that is indicative of movement of said control as the user manipulates said controls; and an energization controller that selectively energizes said feedback unit by providing power to said feedback unit on a continuous basis responsive to certain preselected subsystem controls being activated;

wherein said control is supported to rotate in a first and second direction, respectively, and wherein said feedback unit is electrically operated and provides a plurality of electrically caused tactile increments along a rotation of said control in at least one of said directions;

wherein said feedback unit comprises:
- a rotating member, supported to rotate with said control in said directions, made from a ferromagnetic material and having a plurality of teeth that move as said rotating member is rotated;
- a stationary member positioned so that said rotating member teeth move relative to said stationary member as said control is manipulated in said direction, said stationary member including a plurality of first poles and a plurality of second poles interspersed among said first poles;
- a first winding positioned about each said first pole and connected to said energization controller so that said first windings carry electrical current when said feedback unit is energized; and
- a second winding positioned about each said second pole and connected to said energization controller so that said second windings carry electrical current when said energization controller effectively couples said second windings to a source of electrical energy when said feedback unit is energized and a preselected function of the selected subsystem is manipulated.

6. A device for controlling a plurality of subsystems, comprising:
- a system controller adapted to activate a selected one of the subsystems;
- a single control that is manipulatable by a user to signal to said system controller how to control the selected subsystem;
- a feedback unit that selectively provides tactile feedback to the user that is indicative of movement of said control as the user manipulates said controls; and
- an energization controller that selectively energizes said feedback unit by providing power to said feedback unit on a continuous basis responsive to certain preselected subsystem controls being activated;
  - wherein said control is pivotally mounted to be pivotally manipulated about a pivot point from a centered position in a plurality of directions and wherein said feedback unit includes a magnetic force imposing device that causes a changing amount of tactile resistance to movement of said control as said control is moved from said centered position.

7. The device of claim 6, wherein said feedback unit provides tactile resistance to movement of said control only when said control is manipulated in one of a plurality of preselected directions and increases said tactile resistance as said control is moved further away from said centered position along one of said preselected directions.

8. A method of controlling a plurality of different functions within a plurality of individually selectable subsystems, using a user manipulatable control that has a selectively activatable tactile feedback device, comprising the steps of:

(A) selecting a subsystem (B) choosing a function of the selected subsystem to be controlled;

(C) determining whether providing tactile feedback to the user while controlling the chosen function using the control as desirable; and (D) selectively energizing the tactile feedback device by providing the tactile feedback device with a continuous supply of energy to thereby provide tactile feedback to the user manipulating the control responsive to the determination made in step (C).

9. The method of claim 8, wherein step (D) includes providing power to the tactile feedback device independent of a position of the control.

* * * * *